(12) United States Patent
Mandato et al.

(10) Patent No.: US 7,814,184 B2
(45) Date of Patent: Oct. 12, 2010

(54) HIGH-LEVEL INTERFACE FOR QOS-BASED MOBILE MULTIMEDIA APPLICATIONS

(75) Inventors: Davide Mandato, Fellbach (DE); Ernoe Kovacs, Stuttgart (DE); Klaus Röhrle, Stuttgart (DE); Oliver Schramm, Wolfschlugen (DE)

(73) Assignee: Sony Deutschland GmbH, Cologne (DE)

( * ) Notice: Subject to any disclaimer, the term of this patent is extended or adjusted under 35 U.S.C. 154(b) by 759 days.

(21) Appl. No.: 10/006,067

(22) Filed: Dec. 6, 2001

(65) Prior Publication Data

US 2002/0116545 A1    Aug. 22, 2002

(30) Foreign Application Priority Data

Aug. 12, 2000    (EP) .................................. 00126975

(51) Int. Cl.
*G06F 15/177* (2006.01)
(52) U.S. Cl. ...................................... 709/221; 709/220
(58) Field of Classification Search ................. 709/200, 709/223–226, 221
See application file for complete search history.

(56) References Cited

U.S. PATENT DOCUMENTS

| | | | | |
|---|---|---|---|---|
| 5,644,715 | A * | 7/1997 | Baugher ..................... | 709/228 |
| 6,044,211 | A * | 3/2000 | Jain ............................ | 716/18 |
| 6,154,778 | A * | 11/2000 | Koistinen et al. .......... | 709/228 |
| 6,160,804 | A * | 12/2000 | Ahmed et al. .............. | 370/349 |
| 6,175,569 | B1 * | 1/2001 | Ellington et al. ........... | 370/401 |
| 6,317,438 | B1 * | 11/2001 | Trebes, Jr. .................. | 370/466 |
| 6,446,126 | B1 * | 9/2002 | Huang et al. ............... | 709/226 |
| 6,480,879 | B1 * | 11/2002 | Zinky et al. ................. | 709/201 |
| 6,480,898 | B1 * | 11/2002 | Scott et al. .................. | 709/238 |
| 6,498,788 | B1 * | 12/2002 | Emilsson et al. ........... | 370/342 |
| 6,629,126 | B1 * | 9/2003 | Zinky et al. ................. | 709/201 |
| 6,631,122 | B1 * | 10/2003 | Arunachalam et al. ..... | 370/332 |
| 6,691,148 | B1 * | 2/2004 | Zinky et al. ................. | 709/201 |

(Continued)

FOREIGN PATENT DOCUMENTS

EP    1 158 740 A1    11/2001

OTHER PUBLICATIONS

Cardei, I. et al. Hierarchical Architecture for Real-Time Adaptive Resource Management. Apr. 2000. IFIP/ACM International Conference on Distributed systems platforms. Springer-Verlag New York, Inc. pp. 415, 418, and 421.*

(Continued)

*Primary Examiner*—Benjamin R Bruckart
*Assistant Examiner*—Alicia Baturay
(74) *Attorney, Agent, or Firm*—Oblon, Spivak, McClelland, Maier & Neustadt, L.L.P.

(57) ABSTRACT

The present invention generally relates to the field of mobile multimedia middleware, quality-of-service, shared resource reservation mechanisms, distributed processing systems, handheld computers, computer networking and wireless communication. Particularly, the present invention describes a processing system and pieces of software for one or more communication networks, with middleware comprising an application programming interface (102) cast over a data model describing quality-of-service contracts and quality-of-service adaptation paths specified by quality-of-service aware mobile multimedia applications (101) using said programming interface, in order to manage quality-of-service and mobility-aware for managing network connections with other applications. The present invention hereby relates to a corresponding data model as well as the necessary architecture.

21 Claims, 6 Drawing Sheets

Example: UML Statechart

U.S. PATENT DOCUMENTS

| | | | |
|---|---|---|---|
| 6,708,189 B1* | 3/2004 | Fitzsimons et al. | 707/205 |
| 6,711,141 B1* | 3/2004 | Rinne et al. | 370/328 |
| 6,728,365 B1* | 4/2004 | Li et al. | 379/329 |
| 6,742,020 B1* | 5/2004 | Dimitroff et al. | 709/217 |
| 6,766,368 B1* | 7/2004 | Jakobson et al. | 709/224 |
| 6,816,907 B1* | 11/2004 | Mei et al. | 709/229 |
| 6,850,495 B1* | 2/2005 | Baum et al. | 370/256 |
| 6,865,609 B1* | 3/2005 | Gubbi et al. | 709/230 |
| 6,941,557 B1* | 9/2005 | Jakobson et al. | 719/316 |
| 6,985,722 B1* | 1/2006 | Snelgrove et al. | 455/420 |
| 6,993,026 B1* | 1/2006 | Baum et al. | 370/392 |
| 7,076,552 B2* | 7/2006 | Mandato | 709/226 |
| 7,254,645 B2* | 8/2007 | Nishi | 709/249 |
| 2002/0065922 A1* | 5/2002 | Shastri | 709/227 |
| 2003/0046396 A1* | 3/2003 | Richter et al. | 709/226 |
| 2005/0157660 A1* | 7/2005 | Mandato et al. | 370/254 |
| 2006/0294112 A1* | 12/2006 | Mandato et al. | 707/100 |
| 2008/0097807 A1* | 4/2008 | Chang et al. | 705/7 |

OTHER PUBLICATIONS

Neureiter, G. et al., The Brain Quality of Service Architecture for Adaptable Services with Mobility Support, Sep. 18-21, 2000, The 11th IEEE International Symposium on Personal, Indoor and Mobile Radio Communications, vol. 1, pp. 445-450.*

Jørgensen, B.N., et al., Customization of Object Request Brokers by Application Specific Policies, Apr. 3-7, 2000, Springer-Verlag New York, Inc., Middleware Conference: IFIP/ACM International Conference on Distributed Systems Platforms, pp. 144-163.*

Neureiter G et al: "The Brain Quality of Service Architecture for Adaptable Services With Nobility Support" 11th IEEE International Symposium on Personal Indoor and Mobile Radio Communications. PIMRC 2000. Proceedings (Cat. No. 00TH8525), Proceedings of 11TH International Symposium on Personal, Indoor and Mobile Radio Communication, London, UK, Sept. 18-21, pp. 445-450, vol. 1, XP002168301.

Campbell A T et al: "Programmable Mobile Networks" Computer Networks and ISDN Systems, NL, North Holland Publishing. Amsterdam, vol. 31, No. 7, Apr. 8, 1999, pp. 741-765, XP000700300.

Andrew T. Campbell, et al. "Programmable Mobile Netwoks"; Computer Networks 31 (1999); pp. 741-765.

Saleem N. Bhatti, et al. "QoS Assurance vs. Dynamic Adaptability for Applications"; Computer Science Department, University College London; 4 pages, 1998.

Saleem N. Bhatti, et al. "Enabling QoS Adaptation Decisions for Internet Applications"; Computer Science Department, University College London; pp. 1-24, 1999.

Svend Frolund, et al. "Quality of Service Aware Distributed Object Systems"; Conference on Object-Oriented Technology and Systems, Proceedings of the 5$^{th}$ Conference on Usenix Conference on Object-Oriented Technologies & Systems; vol. 5; San Diego, California 3 pages; Abstract Only, 1999.

* cited by examiner

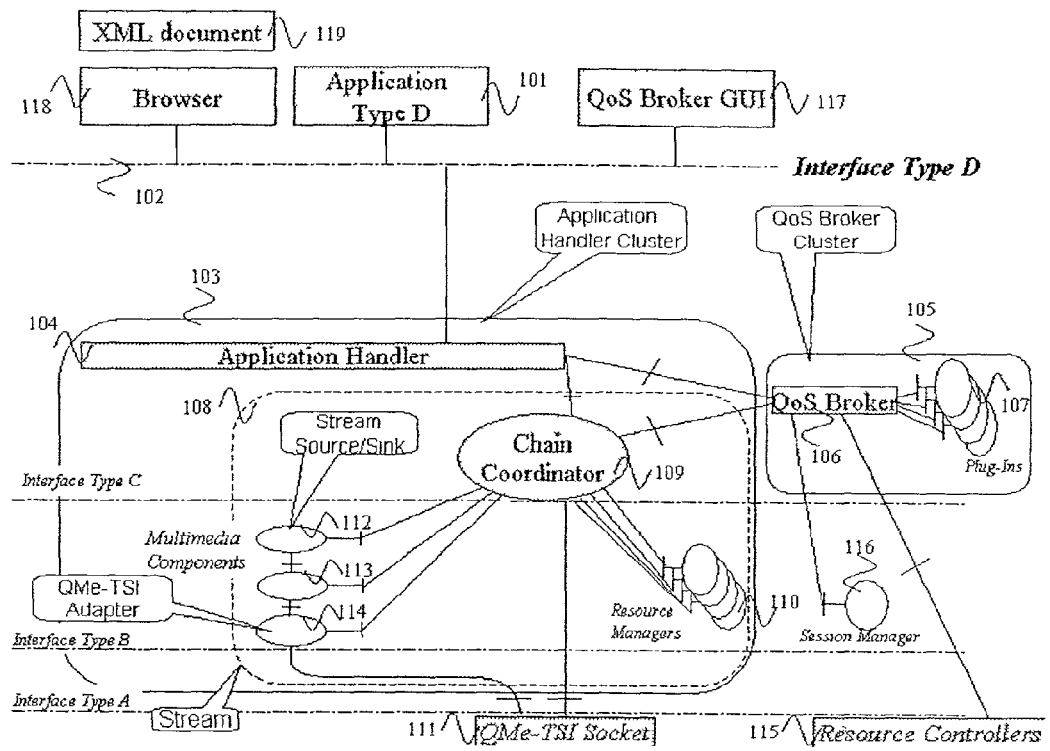
Figure 1: Architecture

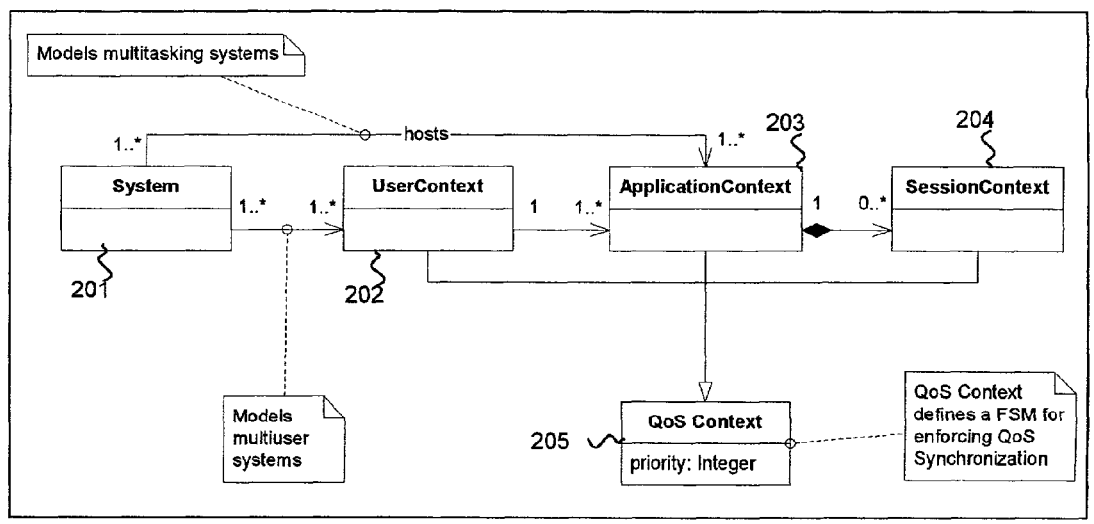
Figure 2 General Data Model: QoS Context

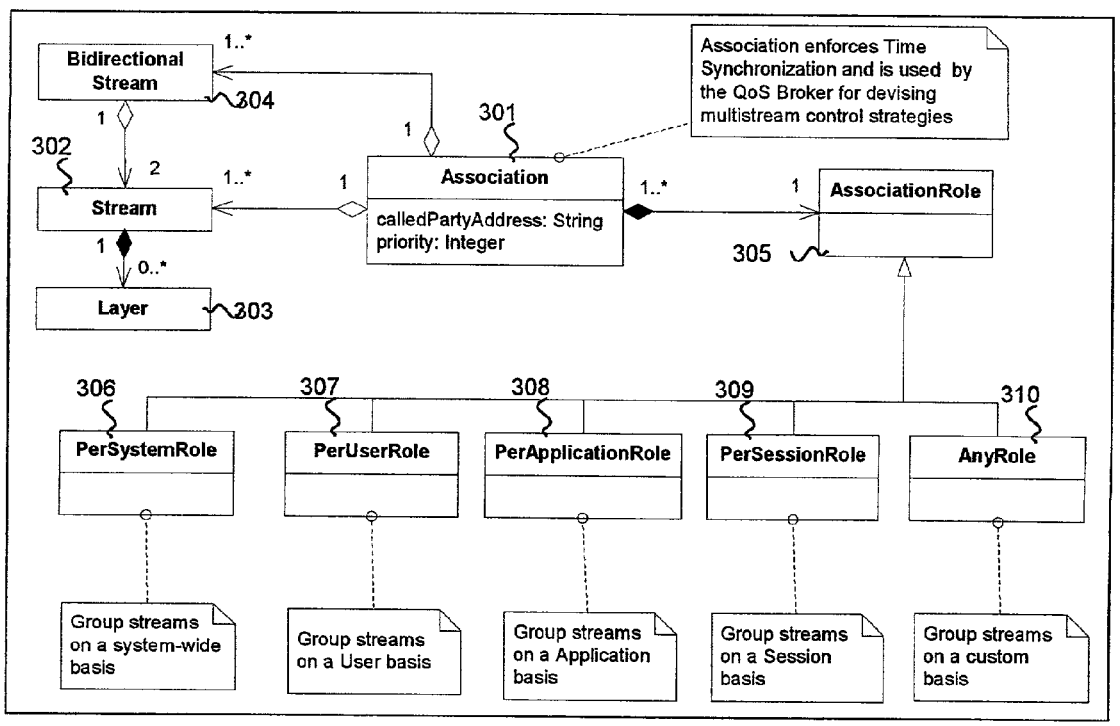
Figure 3 General Data Model: Association

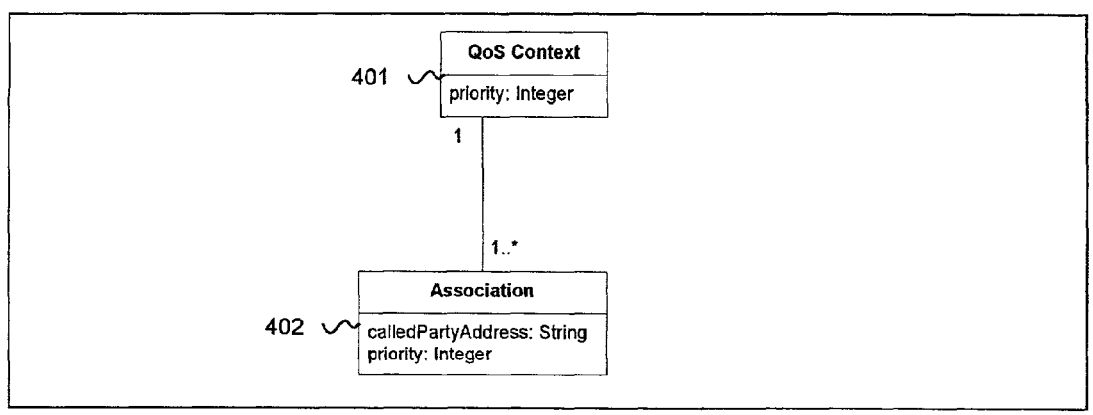
Figure 4 General Data Model: QoS Context vs. Association relationship

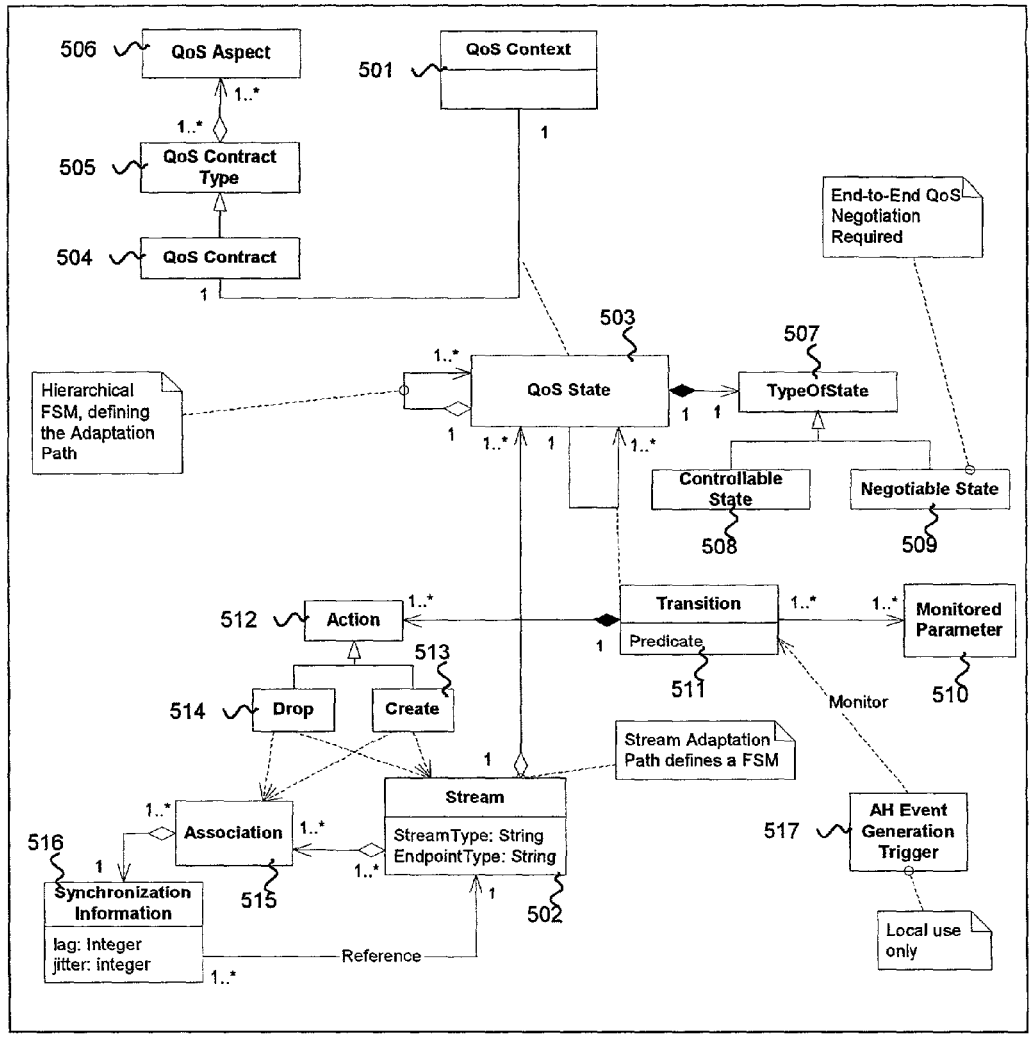
Figure 5: QoS- and synchronisation-specification model

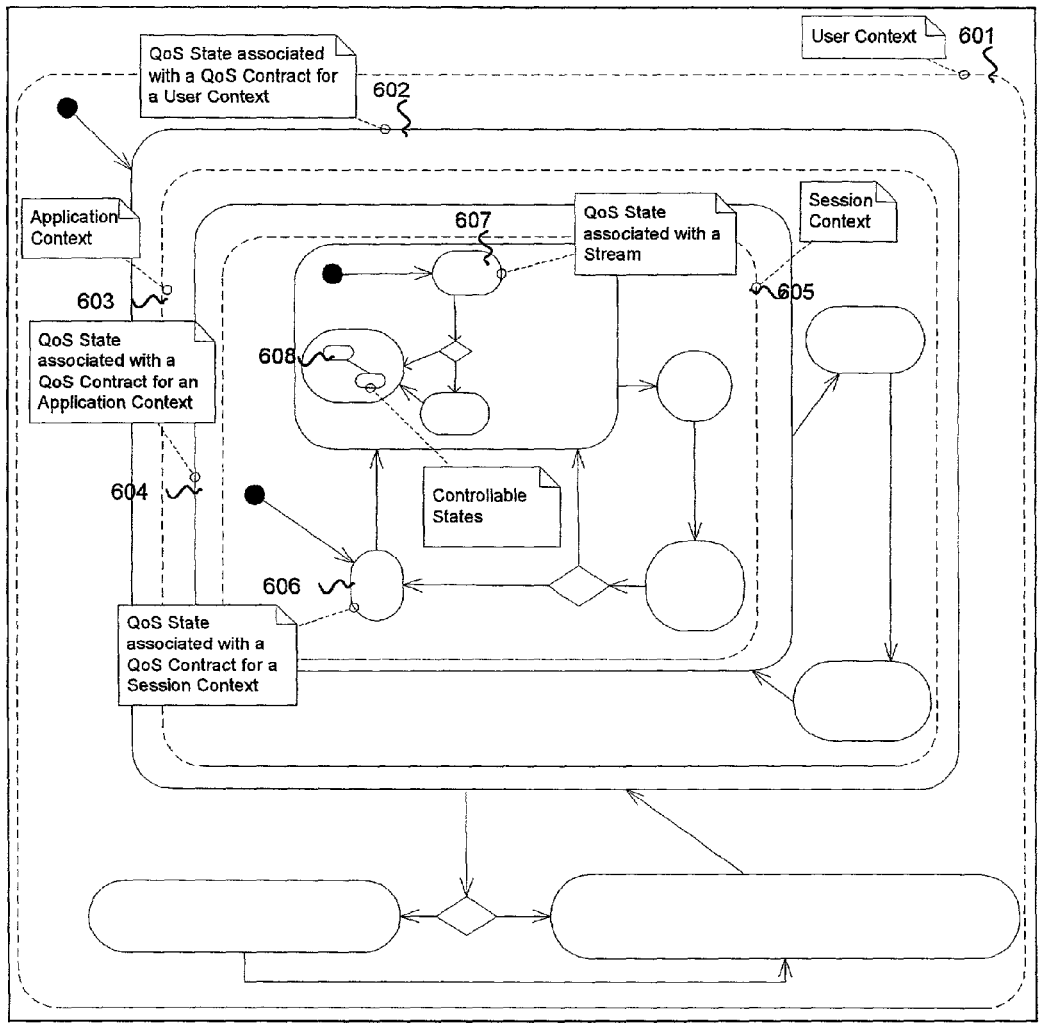
Figure 6 Example: UML Statechart

HIGH-LEVEL INTERFACE FOR QOS-BASED MOBILE MULTIMEDIA APPLICATIONS

The invention presented generally relates to the field of mobile multimedia middleware, Quality of Service (QoS), shared-resource reservation mechanisms, distributed processing systems, handheld computers, computer networking, and wireless communication. The present invention particularly relates to a processing system for a one or more communication networks and to pieces of software for the one or more communication networks, being loadable in one or more memory means of one or more processing devices or nodes of the communication networks.

This patent application extends the concepts introduced by the EP 00 111 191.3, which is hereby incorporated by reference.

As of this writing, the author is aware of the following technologies, which are related to the topic hereby presented:

| Technologies | IP Owner Organizations and/ or Companies | Comment |
| --- | --- | --- |
| GQoS | Microsoft Corp. | The hereby-presented high level, platform- and network-independent API is not bound to any socket concepts rather can build on top of that for dealing with networking issues. |
| QuickTime | Apple Computer, Inc. | The hereby-presented API does provide high level abstractions, which do not necessarily require any preferential multimedia framework, rather can be accommodated on various state of the art frameworks for dealing with multimedia component management. |
| RealPlayer RealServer | RealNetworks | |
| Java Beans Java Media Framework | Sun Microsystems Inc. | |
| DCOM Media Player SDK Media Format SDK | Microsoft Corp. | |
| QML [S. Frolund, J. Koistinen, QML: A Language for Quality of Service Specification, HP-Lab Technical Reports, HPL-98-10, 980210 (http://www.hpl.hp.com/techreports/98/HPL-98-10.html] | Hewlett-Packard | The hereby-presented API extends QML concepts and uses an object model rather than a modeling language. This invention proposes also the use of hysteresis thresholds. |
| QDL [J. P. Loyall et al., Qos Aspect Languages and their Runtime Integration, in Lecture Notes in Computer Science, Vol. 1511, Springer-Verlag] | BBN Technologies GTE Interworking | The hereby-presented API extends QDL concepts and de-couples QoS contracts from and QoS policies. This invention distinguishes among Negotiable and Controllable QoS States instead of negotiated and control regions. |
| QoS Adaptation State Machine [S. N. Bhatti, G. Knight, Qos Assurance vs. Dynamic Adaptability for Applications, Computer Science Department, University College London], [S. N. Bhatti, G. Knight, Enabling QoS adaptation decisions for Internet applications, Computer Science Department, University College London] | Saleem N. Bhatti, Graham Knight University College London | Define State Machines for QoS Adaptation, but not in a hierarchical structure as proposed in this invention. This invention furthermore defines the FSM structure based on a data model that can be even specified by using markup languages like XML. Define mechanisms (based on fuzzy logic) for triggering transitions in the FSM only when the corresponding conditions are constantly met over a given period of time. This invention uses similar concept of guard timers associated with the Monitored Parameters |

This patent application extends the concepts introduced in EP 00 111 191.3, more specifically the present patent application develops the Interface Type D introduced by the aforementioned EPA.

As indicated in EP 00 111 191.3, most of state of the art QoS-aware, elastic applications need to embed proprietary QoS adaptation logic, to the detriment of fast time-to-market and interoperability. Developers must be skilled in the art of QoS specification, management, and control. Furthermore, deep knowledge of the underlying platform is required. As a side effect, applications are thus complex and fat.

Streams originated by different sources cannot be homogeneously treated with respect to QoS adaptation issues.

Architectures are extensible based only on functional requirements, without taking QoS constraints into account.

The processing system for one or more communication networks according to the present invention is claimed in claim 1 and comprises middleware with an application programming interface describing quality-of-service contracts and quality-of-service adaptation paths specified by quality-of-service aware multimedia applications for managing network connections with other applications. Hereby, the processing system according to the present invention can consist of distributed processing devices in the communication networks. The processing system or the processing devices are e.g. servers, computers, and the like and comprise the middleware offering the respective functionalities. The communication networks can be wired and/or wireless networks.

The pieces of software for one or more communication networks according to the present invention are claimed in claim 1. The pieces of software are loadable in one or more memory means of one or more processing devices or nodes of the one or more communication networks and comprise middleware with an application programming interface describing quality-of-service contracts and quality-of-service adaptation paths specified by quality-of-service aware multimedia applications for managing network connections with other applications. Thus, the software according to the present invention presents the middleware which can be implemented in processing devices, such as service, computers and the like of the communication networks.

Advantageous features are claimed in the respective subclaims.

Advantageously, the adaptation paths are expressed as hierarchical finite state machines based on quality-of-service contexts. In this case, a quality-of-service context advantageously identifies an arrangement of quality-of-service specifications to be enforced throughout a given set of streams. The hierarchical finite state machines advantageously comprise controllable states in the context of streams at the lowermost level. Advantageously, quality-of-service synchronisation is provided so as to ensure that some user's given constraints are enforced throughout a given set of streams (e.g. guaranteeing) that the aggregate quality-of-service for a number of streams is not below a minimum threshold; or that streams belonging to a given group can be assigned more or less quality-of-service out of a bulk resource reservation, based on a priority scheme that can be even altered at run time by the user and/or the communication system. The specification of the quality-of-service contracts advantageously comprises hysteresis parameters for the transition between quality-of-service states. Further advantageously, the specification of the quality-of-service contracts comprises utility parameters defining user's perceived utility factors associated with the respective quality-of-service contract.

The high Level Application Programming Interface (API) according to the present invention provides QoS-aware mobile multimedia applications with the possibility to establish, use, and release network connections with other applications, using QoS guarantees. These guarantees being enforced by having the applications specifying QoS Contracts and Adaptation Paths to the middleware offering said API, and by delegating QoS adaptation tasks to said middleware. Said applications being solely interested in events forwarded by said API only when the given user-specified QoS Contract and Adaptation Path cannot be fulfilled. The middleware offering said API being able to translate user's specifications and requests into a strategy for selecting, configuring, managing, and releasing multimedia software and/or hardware components, in cooperation with the peer middleware. This API merges the concept of declarative interface (i.e. describing what tasks the user wants to be done and not how said tasks should be accomplished) with some concepts of Aspect Oriented Programming (AOP) (i.e. addressing crosscutting QoS concerns in a modular way).

Advantageously, the application programming interface according to the present invention is offered by an application handler unit.

Advantageously, the application handler unit registers requests for notification events from applications and generates such events whenever the corresponding triggering conditions occur. Further advantageously, the application handler unit operates on the basis of a data model comprising streams, quality-of-service context and quality-of-service associations. In this case, the application handler unit advantageously creates for each unidirectional stream an instance of a chain controller for handling data plane and quality-of-service control plane related issues. Further, the chain controller can in this case compare the quality-of-service requirements of a user with external values of monitored parameters and configures a chain of multimedia components accordingly. Hereby, the chain controller advantageously creates and manages a transport service interface socket, whereby the multimedia components directly exchange data through the transport service interface socket.

Advantageously, the chain controller monitors and controls the local resources required to process the given stream by using resource managers.

Further advantageously, a quality-of-service broker is provided for managing overall local resources by managing the whole set of streams via the chain controllers. Hereby, the quality-of-service broker can manage system-wide resources via resource controllers. The quality-of-service broker can control end-to-end-quality-of-service negotiation by using a session manager. Further advantageously, the quality-of-service broker includes further functionality for downloading plug-ins corresponding to a given version of a data model which cannot be handled by the application handler unit.

Hereby, the quality-of-service broker and the plug-ins are forming a quality-of-service broker cluster.

Advantageously, the application handler unit and the various instances of the chain controller are forming an application handler cluster. Hereby, the application handler cluster and the quality-of-service broker cluster are included in one open distributed processing capsule. Alternatively, the application handler cluster and the quality-of-service broker cluster are included in separate open distributed processing capsules. In the latter case, the application handler cluster being included in one open distributed processing capsule can be installed on a given local node and the quality-of-service broker cluster being included in separate open distributed processing capsules can be installed on a separate open distributed processing node, whereby a proxy quality-of-service broker is installed on the given local node.

The advantageous functionalities of the present invention are:

Capture Adaptability concepts: the API is able to allow the underlying middleware decide the best strategy to cope with requests to change the perceived level of QoS from either user side and/or from remote user/network side.

Expressiveness: the API 102 is able to capture the application developers' high level requirements in a concise and effective way Ease of use.

Platform-independence

Multi-stream time-synchronization: the API is able to let the application developers set constraints on the timing relationships among streams originated by different sources.

Multi-stream QoS-synchronization: the API is able to let the application developers set constraints on the relationships among streams originated by different sources, in order to enforce a homogeneous QoS specification and adaptation treatment among said streams.

Extensibility: the API is able to deal not only with issues identified during the API design-phase, but also any custom-specific QoS and policy specifications.

Event-based call-back model: this API lets the developers register their applications with said API in order to be notified via event-based mechanism, whenever the QoS Broker is not able to fulfill its obligations, due to some extraordinary event (e.g. QoS violations due to hand-off). This is a form of very high level application adaptability to QoS changes: for instance, during black-out periods due to hand-offs, the application can be promptly informed so that special courtesy information about the out-of-service event can be gracefully presented to the application users.

The present invention is explained in more detail in the following description in relation to the enclosed drawings, in which FIG. 1 shows a schematic representation of the architecture of a communication network and the software according to the present invention.

FIG. 2 shows a schematic representation of the QoS context of the general data model according to the present invention, FIG. 3 shows a schematic representation of the QoS association of the general data model according to the present invention, FIG. 4 shows a schematic representation of the relationship between the QoS context and the QoS association of a general data model according to the present invention, FIG. 5 shows a schematic representation of the QoS- and synchronisation-specification model according to the present invention, and FIG. 6 shows a schematic example of a UML state chart for the present invention.

The following table 1 gives the definitions of terms used in the present description.

TABLE 1

| Term | Definition |
| --- | --- |
| Adaptation | Mechanisms altering the application behavior so much as to compensate any fluctuation and/or even dramatic change in data transmission and/or processing quality, based on some user requirements specifying said quality. These mechanisms can be included in the application, or provided by some external entity (e.g. middleware). |

TABLE 1-continued

| Term | Definition |
| --- | --- |
| Aspect Oriented Programming | Aspect-oriented programming is a new programming methodology that enables the modularization of crosscutting concerns. Many concerns are difficult to modularize using standard procedural or object-oriented technology. Examples include: the exception handling policy for an entire system the protocol of interaction among a set of objects that collaborate to perform a larger task the synchronization constraints among groups of objects in a multi-threaded system performance optimizations like caching or specialization the mechanism that implements a security policy Quality of Service issues Instead of being well modularized, the code for these concerns tends to be spread out in many places across the system. We say that these concerns crosscut the system's modularity. In practice, crosscutting concerns present a significant problem to developers. Because they are spread out, they are harder to find, change, or replace than well modularized concerns. A typical experience is that making a conceptually simple change will require searching to find all the occurrences of a nearly identical code fragment. Unfortunately, the search doesn't usually find all of them on the first try, which leads to debugging problems. A new unit of software modularity, called an aspect, appears to provide a better handle on managing crosscutting concerns. Like objects, aspects are intended to be used in both design and implementation. During design the concept of aspect facilitates thinking about crosscutting concerns as well-defined entities. During implementation, aspect-oriented programming languages make it possible to program directly in terms of design aspects, just as object-oriented languages have made it possible to program directly in terms of design objects [Xerox-PARC's Aspect Oriented Programming Web-Site: http://www.parc.xerox.com/csl/projects/aop/]. |
| Association 301 | Any grouping of streams leading to a well defined logical destination endpoint (thereinafter the peer), used for enforcing time synchronization among the various grouped elements with respect to a reference one. A peer identifies an actor (which might be a called party in a conversational service or a server in an information retrieval service), which can be represented by one or multiple transport protocol addresses (one for each individual stream). Associations can be prioritized, in order to let the QoS Broker 106 decide the best strategy for coping with QoS changes. |
| Declarative Interface | Communications of the description of goals, facts, and relations between a service user and a service provider. The latter analyses the description and then does whatever is necessary to carry out the requested task. Said description does not directly specify what mechanisms the service provider shall use to carry out the given tasks. |
| Adaptation Path | A list of alternative QoS contracts, each associated with a specific set of altered conditions with respect to the reference QoS requirements originally specified by the user. This list is used by QoS Brokers in order to degrade (or upgrade) the QoS in a controlled manner. |

TABLE 1-continued

| Term | Definition |
| --- | --- |
| Elastic Application | Application featuring adaptation, either through some built in capabilities, or thanks to some external means. An application capable of dealing with mutated networking and computing conditions in a controlled manner. |
| Quality of Service, QoS | The collective effect of service performance which determines the degree of satisfaction of a user of the service |
| QoS Broker 106 | Software unit orchestrating local, remote, and network resources, in order to provide and maintain a given level of QoS, as requested by all the cooperating parties. More specifically, the QoS Broker coordinates resource management across the various software and hardware units used within the system. To this extent, the QoS Broker manages QoS parameter translation, admission test, and negotiation. Therefore, the QoS Broker acts as an intermediary, dispensing cooperating entities from being aware of operational details concerning with other entities. |
| QoS Context 205 | Represents a collection of information and behavior characteristics shared by a group of controllable entities like e.g. user subscriptions, SW applications, groups of telecommunication connections. QoS Contexts are associated with own QoS Contracts 504 and Adaptation Paths in order to enforce QoS constraints on all the grouped elements (the hereby-introduced concept of QoS-Synchronization). QoS Contexts can be prioritized, in order to let the QoS Broker 106 decide the best strategy for coping with QoS changes. |
| QoS Contract 504 | Agreement between a user and a given service provider, specifying QoS requirements and constraints, as well as the policies required to keep track about QoS during all phases of said service. |
| QoS Contract Type 505 | Represents a QoS Category: it captures the structure of a class of QoS Contracts, by identifying how individual QoS Contracts specify the QoS properties over a given set of QoS parameter types (also known as dimensions in [S. Frolund, J. Koistinen, QML: A Language for Quality of Service Specification, HP-Lab Technical Reports, HPL-98-10, 980210 (http://www.hpl.hp.com/techreports/98/HPL-98-10.html)]. Each parameter type consists of a name and a domain of values. QoS specifications can be simply intended as a set of constraints over said domains, one per parameter type. |
| QoS Specification | General term for identifying set of QoS parameters and constraints specified by a user. |
| QoS State 503 | The association of a given QoS Context with a given QoS Contract, within the context of an adaptation path, modeled as a hierarchical FSM [G. Booch, J. Rumbaugh, I. Jacobson, The Unified Modeling Language User Guide, Addison Wesley Longman, 1999, ISBN 0-201-57168-4]. QoS States can be classified into Negotiable and Controllable QoS States, the difference being that formers are associated with actions that the peer QoS Brokers 106 must negotiate upon. |
| Streams 302 | Model the continuous unidirectional flow of information. |

The following table 2 gives a list of abbreviations used in the present description.

TABLE 2

| AH | Application Handler |
| API | Application Programming Interface |
| ChC | Chain Controller |
| COTS | Commercial Off-The-Shelf |
| EPA | European Patent Application |
| FSM | Finite State Machine |
| GUI | Graphical User Interface |
| HW | Hardware |
| IP | Internet Protocol |
| PDA | Personal Data Assistant |
| QDL | Quality Description Languages |
| QMe-TSI | QoS- and Mobility-enabled Transport Service Interface [EP 00 111 191.3, hereby incorporated by reference] |
| QML | QoS Modeling Language |
| QoS | Quality of Service |
| SW | Software |
| UML | Unified Modeling Language |
| XML | Extended Markup Language |

I. Overview

As indicated in EP 00 111 191.3, hereby incorporated by reference, QoS-aware mobile multimedia applications 101 can be more easily and quickly developed by delegating QoS concerns to QoS Brokers 106 and by allowing the users to simply specify what type of networking connections shall be created, managed, and released, with respect to chosen QoS specifications.

With this type of thin applications 101, called application type D in EP 00 111 191.3, one can leverage component-based QoS middleware 103/105, which is able to adapt to violations of QoS contracts 504 on behalf of the applications 101. The component-based nature of such middleware allows modularity and extensibility.

FIG. 1 depicts the architecture designed to offer the hereby-described API 102. The Application Handler (AH) 104 is the entity actually offering said API 102 to applications 101. The AH 104 uses the data model defined for said API (see II.), registers requests for notification events from applications, and generates such events whenever the corresponding (exceptional) triggering conditions occur.

The AH 104 creates for each unidirectional stream an instance of a Chain Controller (ChC) 109 and delegates the core QoS adaptation logic (including the interpretation of the aforementioned data model) to the QoS Broker 106 (cf. EP 00 111 191.3, hereby incorporated by reference), which in turn delegates stream-level QoS adaptation logic to the ChC's 109.

Each ChC 109 handles for the given stream both Data Plane and QoS Control Plane related issues. With respect to the latter, the ChC 109 compares the QoS requirements of the user with the actual values of monitored parameters 511, and configures a chain of multimedia components 112/113/114 accordingly. The ChC 109 monitors and controls the local resources required to process the given stream by using Resource Managers 110 (cf. EP 00 111 191.3). The ChC 109 creates and manages a QMe-TSI socket 111 (cf. EP 00 111 191.3), whereas said component chain 112/113/114 directly exchanges data through said socket 111.

The QoS Broker 106 manages the overall local resources by managing:

the whole set of streams via the ChC's 109 any other system-wide resource via the Resource Controllers 115 (cf. EP 00 111 191.3).

The QoS Broker 106 also deals with End-to-End QoS negotiation issues by using the Session Manager 116 abstraction for using whatever session layer protocol is available (e.g. SIP (cf. EP 00 111 191.3)).

The QoS Broker 106 can be extended to include additional functionality, by using the concept of QoS Broker plug-ins 107. Whenever the QoS Broker 106 determines that it is not able to deal with a given version of the API 102 data model (see §II.), the QoS Broker can (either autonomously or via user interaction) decide to download a plug-in corresponding to the given version of the data model.

The AH 104 and the various instances of ChC's 109 (along with their chains 112/113/114 and Resource Managers 110) can be clustered together 103, according to the ISO Open Distributed Processing (ODP) engineering viewpoint concept of clusters.

Similarly, the QoS Broker 106 and its plug-ins 107 can be clustered together in a QoS Broker ODP cluster 105.

Applications 101 can thus be configured in various modes:
- Including both the AH cluster 103 and the QoS Broker cluster 105 in one ODP capsule (i.e. in a single memory address space)
- Including only the AH cluster 103 in the application ODP capsule, thus confining the QoS Broker cluster 105 to a separate ODP capsule. The latter can either by a dynamic link library or a daemon. In the latter case, Inter-Process Communication (IPC) mechanisms would be required to allow the application capsule communicating with said daemon.
- Including only the AH cluster 103 in the application ODP capsule, and using the QoS Broker cluster 105 as provided in a separate ODP capsule installed on a separate ODP node (i.e. a computing unit). In this case, a Proxy QoS Broker capsule is however required on the given local node to allow the remote QoS Broker 106 to manage the local resources of said local node.

This modular architecture provides flexibility, insofar as it can enable various state of the art and future scenarios. The core QoS Broker 106 functionality can in fact be eventually embedded in the network (in a hierarchical structure of Network QoS Brokers), with Proxy QoS Broker located in the user's computing units and acting as agents on behalf of said Network QoS Brokers.

One should note that the user may be enabled to retrieve, customize, manage, and store personal policies/preferences, through specific GUI like e.g. a QoS Broker GUI 117 and units like profile manager entities and profile databases. Such information shall capture for instance in an XML-document the description of the instance of the API Data Model (see next paragraph) that a user may want to later reuse.

II. API Data Model

This invention refines the information viewpoint described in EP 00 111 191.3, by introducing additional levels of abstractions, and by defining qualitatively the QoS-related aspects of each abstraction.

FIG. 2, FIG. 3, FIG. 4 and FIG. 5 depict the key concepts of the information viewpoint (in form of UML class diagrams). Users shall be able to access multiple devices (or, more generally, systems 201), to run one or multiple applications. Given an application, the user shall be able to create an instance of a telecommunication session (e.g. a conference call) with other parties. The session thus groups all the logical associations between all the parties involved in it, where each association identifies a group of unidirectional streams of information originating from the given computing unit and leading to a given peer party within the given session.

To this extent, this invention introduces the concept of Streams 302, QoS Context 205, and QoS Associations 301.

II.1 The Stream Concept

Streams 302 model the continuous unidirectional flow of information. Different types of streams may exists: audio, video, data, text, or any combination thereof. A given party may act as a pure stream source (i.e. it exclusively sends out information), as a pure stream sink (i.e. it collects streamed information from the other party), or as both source and sink (typical of a conversational mode).

Streams 302 can multiplex Layers 303, where each Layer enhancing incrementally the level of detail relative to the base information (carried by the so-called base layer). This means that adding Layers can progressively increase the level of detail of the base information. Example: MPEG-2.

The QoS Broker 106 uses the Stream 302 concept as the elemental unit of control while performing QoS provision and management tasks, but the QoS Broker can be also programmed to work:
- at lower resolution (by directly addressing Layers 303), or
- at a higher resolution (by bundling input and output Streams 302 in Bi-directional Streams 304).

II.2 The QoS Context Concept

A QoS Context 205 identifies an arrangement of QoS specifications that shall be enforced throughout a given set of Streams 302. In this way, the QoS Context 205 concept can be used for enforcing the aforementioned QoS-synchronization requirement throughout said set of streams. This means that whatever the QoS specification of each stream may be, the QoS Context forces a set of QoS constraints to be applied to the all streams belonging to said set.

For instance, electronic game applications and/or media-rich interactive applications offer other examples of multi-streams applications, where bundles of audio and video streams are associated with objects to be presented to the user. For example, a moving and/or rotating cube can be displayed on a monitor with its faces textured with images from video streams; and different audio streams, each associated with a cube face, can be played whenever the corresponding face is oriented to a certain direction.

To this extent, this type of applications shall be able to guarantee not only that related streams are played within given temporal relationships (time-synchronization), but also that the aggregate QoS experienced by the streams is not below a minimum threshold (QoS-synchronization).

For instance, just continuing the game application example, it could make no sense to have some facets of the cube being textured as black and white movies, and others as high quality color still images, even though the images were completely synchronized from a sheer temporal perspective. It would make more sense to have all facets displaying black and white movies, thus avoiding the pointless consumption of resources to get color images to the detriment of the frame rate at which said images would be displayed.

Of course the decision of what level of correlation should be enforced at QoS level among a set of streams is left to the developers' and even to the user's discretion.

Furthermore, QoS-synchronization can address QoS constraints that might need to be enforced on the QoS specifications of each Stream 302 belonging to the given QoS Context 205. Following the definitions set forth in [ITU-T Recommendation X.641 (12/97) | ISO/IEC 13236:1998, Information Technology—Quality of Service: Framework] QoS parameters (thereinafter, the QoS characteristics) identify measurable QoS-related quantities and can be further classified into generic, specialized, and derived ones:
- Generic QoS characteristic try to capture a common underlying QoS parameter that can be applied to any particular circumstance, independently thus of what it is applied to.
- Specialized QoS characteristics are concrete instances of generic QoS characteristics (eventually, generic QoS characteristics can be sufficiently concrete to be used as is, but in most of the cases a specialization is required to capture the system- or network-specific peculiarity). For instance, a generic Time Delay QoS characteristic can be further specialized so as to reflect system implementation specific issues. The specialization approach is well suited for addressing complex distributed systems, by mapping QoS characteristics at appropriate levels of abstractions.

Derived QoS Characteristics capture the dependencies of some QoS characteristics on others, based on some mathematical relationships. Some derived QoS characteristics may even be of statistical nature (e.g. maximum, minimum, range, mean value, variance and standard deviation, n-percentile, statistical moments, etc.).

Even derived QoS characteristics can be specialized the same way as with the generic ones. Therefore, specialization and derivations can be regarded as orthogonal transformations of QoS characteristics. However, it must be noted that derivation may involve more than one generic/derived/specialized QoS characteristic (e.g. availability is a function of reliability and maintainability).

QoS Contexts 205 can thus capture (in an associated QoS Contract 504) also those QoS parameters derived from the QoS specifications of the Streams 302 that belong to said QoS Context. For example, the total amount of memory or the average bandwidth used by the given set of streams.

Finally, QoS Contexts 205 can also address specific QoS parameters that indirectly affect to all the underlying streams (e.g. system-level reliability issues). To sum up, QoS Contexts 205 deal with QoS-synchronization issues, and more specifically with:

Common level of QoS specification for a group of Streams 302

Derived QoS parameters

QoS parameters indirectly affecting QoS specifications of Streams 302

The QoS Context 201 concept can be further refined in various ways. This invention presents a default model, which is considered to be sufficiently detailed to take into account the many aspects of the given problem domain. The QoS Broker Plug-in 107 concept, along with the specific introduction of QoS Contract Type 505 concepts, allow in any case the possibility to extend or even define alternative models.

The hereby-presented model includes three types of QoS Contexts 205: the User Context 202, the Application Context 203, and the Session Context 204.

The User Context 202 defines the context of a given user (either restricted to the given computing unit the user is currently using, or extended to a set of computing units the user might be using concurrently). For instance, a given user can define (or be assigned) a given quota of a given type of resources, no matter what applications the user runs.

The Application Context 203 describes the context of a given application. For instance, real-time requirements (minimum scheduling frequency), no matter of what specific activities the user exercises through said application.

The Session Context 204 describes the context of a given session. For instance, the priority of a business-related videoconference session with respect to a private one, which is run concurrently to the former, no matter of what the QoS specifications of each individual Streams within said sessions may be. Following the same example, derived QoS parameters can be forced on a Session Context 204 by e.g. imposing that the overall bandwidth consumption of all the Streams 302 of a given videoconference session, shall not exceed a given threshold (and/or be less than a minimum level).

By following the aforementioned logical relationships among user, applications, and sessions, any given Session Context 204 can be nested in an Application Context 203, and the latter can be nested in a User Context 202. This means that the QoS parameters of a given QoS Context 201 can be derived from those of nesting QoS Contexts 201, and/or be indirectly applicable to the nested QoS Contexts 201.

Furthermore, each QoS Context 205 can be assigned a priority, which the QoS Broker 206 can use to determine the relative importance of siblings QoS Contexts, should some corrective actions required (e.g. preempt an application due to heavy load of the given computing unit).

Each QoS Context 205 can be associated with a Finite State Machine (FSM), as it will be described later.

II.3 The Association Concept

Streams 302 (and eventually Bi-directional Streams 304) can be grouped by using various criteria. The basic stream-grouping concept can be abstracted in the Association 301 concept. The Association 301 is any type of user-specified grouping of unidirectional flows of information originating from the given computing unit and leading to a given peer party within the given session. Therefore the Association 301 shall include an identifier of said peer party (e.g. a URL, a phone number, a pair of IP address and TCP port number).

QoS Associations 301 define time-synchronization constraints on a multiplicity of related Streams 302, all originating from a terminal device and leading to the same endpoint.

Associations are mainly useful for representing bundles of Streams, which the QoS Broker 106 can handle as whole when trading off quality to resource availability among a multiplicity of equivalent bundles. To this extent, like for QoS Contexts 205 also Associations 301 can be assigned priorities, so as to allow the QoS Broker 106 to devise the best strategy for coping with a changed QoS scenario (e.g. dropping or degrading the quality of a whole Association 301).

Each Association 301 can be further specialized in various types of Streams grouping. Similarly to the case of QoS Contexts, this invention presents a default model, which is considered to be sufficiently detailed to take into account the many aspects of the given problem domain. The QoS Broker Plug-in 107 concept, along with the specific introduction of QoS Contract Type 505 concepts, allow in any case the possibility to extend or even define alternative models.

The hereby-proposed model is based on different Association Roles 305, each addressing the clustering of Streams 302 in associations at different levels, as described below:

Per System Role 306: groups all the Streams 302 originated by the given computing unit and leading to the same specific peer endpoint Per User Role 307: groups all the Streams 302 originated by the given user operating on the given computing unit, whereby said Streams 302 lead to the same specific peer endpoint Per Application Role 308: groups all the Streams 302 originated by the given user using the given application on the given computing unit, whereby said Streams 302 lead to the same specific peer endpoint Per Session Role 309: groups all the Streams 302 originated by the given user using the given application on the given computing unit, whereby said Streams 302 lead to the same specific peer endpoint within the context of a given session Any Role 310: groups Streams 302 and leading to the same specific peer endpoint based on custom grouping criteria.

The definition of these roles (with the exception of the Any Role 310) is therefore reflecting the QoS Context model described in the previous paragraph. More specifically one can note that:

the Per Session Role 309 is a specialization of the Per Application Role 308;

the Per Application Role 308 is a specialization of the Per User Role 307;

the Per User Role 307 is a specialization of the Per System Role 306.

II.4 Relationship Between QoS Context and QoS Association

QoS Contexts 205 differ from QoS Associations 301 insofar as the formers specify QoS parameters that should be enforced throughout the whole set of Streams 302 belonging to one or multiple QoS Associations, as indicated in FIG. 4 (UML class diagram).

II.5 QoS- and Synchronisation-Specification Model

FIG. 5 depicts as a UML class diagram the model hereby proposed for capturing and enforcing both QoS- and synchronization-specifications. The latter, as aforementioned, can be further classified into time-synchronization and QoS-synchronization.

QoS specifications are modeled as QoS Contracts 504. QoS Contracts are instantiations of QoS Contract Types 505, which—differently from the original QML specification—are de facto used to catch multiple QoS Aspects 506. A QoS Aspect groups a certain number of QoS parameters related to a specific cross-cutting QoS concern (see definition of Aspect Oriented Programming in §1.3). QoS Contract Types can be sub-typed and can be standardized, so that the QoS Broker 106 can interpret the semantics of a QoS Contract and decide whether it has enough capability to enforce such contract or not. In the latter case, the QoS Broker is designed to be able to eventually select and remotely access or download a component (i.e. QoS Broker Plug-in 107), which is specifically designed to handle the given QoS Contract.

Time-synchronization is modeled by identifying a reference Stream 502 in a given Association 515, and by associating each Stream belonging to the given Association with Synchronization Information 516. The latter specifies the maximum delay and maximum jitter of a given Stream with respect to the reference Stream.

QoS-synchronization is modeled by defining for each QoS Context 501 a given QoS Contract 504.

The QoS Broker 106 shall ensure the consistency of the QoS Specifications with respect to both time- and QoS-synchronization constraints, and raise exceptions to the Application 101 (via the HA 104) should any incongruity be detected.

The Contract Types 505 capture a multiplicity of QoS Aspects 506, each specifying individual QoS Dimensions (e.g. bandwidth, frame rate, etc.), expressed like in. With respect to each QoS Dimensions, a QoS Contract 504 shall be able to specify the following additional information:

Introduce continuous value intervals

Extend the use of discrete value intervals defined in discrete intervals already defined in QML for discrete QoS dimensions this invention sets discrete values also for continuous QoS dimensions Introduce marginal utility % weights Example (using an enhanced version of QML):

```
myContract = ReliabilityContractType contract {
  Reliability.numberOfFailures < 10 no/year
  Reliability.availability {/*NEW: marginal utility*/
    utility 30 = 0.9
    utility 40 = 0.75
    utility 90 = 0.68
```

-continued

```
    utility 60 = 0.42
    utility 10 = 0.20
  }
  Performance.delay { /*NEW: marginal utility*/
    utility 20 < 150
    utility 80 == (150, 340]
    utility 0 > 340
  }
  Performance.throughput == (0.5, 4]/*NEW: continuous interval */
}
```

II.6 Adaptation Path

Based on the definitions set forth in the previous paragraphs, this invention ultimately proposes a data model that defines generic data containers for specifying application-specific QoS parameters, along with adaptation policies.

More specifically, adaptation policies shall identify well-defined adaptations of the basic QoS specification to a set of alternate degraded QoS specification (i.e. lower levels of QoS), in correspondence to well-defined sets of QoS changes, as monitored by the overall middleware 103/105 and the Resource Controllers 115 (cf. EP 00 111 191.3).

Due to the hierarchical structure of QoS Context 501 and Associations 515, which reflects the way such adaptation policies are structured, it is hereby envisioned that the right model to address this complex issue is to model policies as hierarchical Finite State Machines (FSM) [G. Booch, J. Rumbaugh, I. Jacobson, The Unified Modeling Language User Guide, Addison Wesley Longman, 1999, ISBN 0-201-57168-4].

Each State 503 of such hierarchical FSM uniquely identifies the one-to-one relationship between a given QoS Contract 504 and a QoS Context 501.

States 503 can be classified into two Types of States 507:

Negotiable States 509: the hierarchical FSM can access this kind of states only upon preliminary successful negotiation of the QoS Contract 504 associated with the given State 507. Transitions among these states involve only negotiation mechanisms.

Controllable States 508: at the lowermost level of the hierarchical FSM (i.e. at Stream 502 level) one can access this kind of states without the need to have the source and sinks of a given stream to negotiate anything among themselves, except for signaling e.g. the type of codec. Transitions among these states involve only control mechanisms.

More specifically, Controllable States are yet another level of inner states embedded within the Negotiable States and are defined and used exclusively by the middleware 103/105 for handling the internal mechanisms associated with the use of the Multimedia Components 112, 113, 114.

Each Transition 511 of such hierarchical FSM describes a peculiar QoS change, which the system shall react to. The Transitions 511 are triggered whenever specific predicates (i.e. the comparison of values of Monitored Parameters 506 against QoS contracts statements) evaluate to true. Transitions 511 are associated eventually with high level Actions 512 (e.g. drop Streams 502—Drop action 514—or start new Stream—Add action 513). These actions can be eventually cause the AH 104 to generate events to the application 101 (e.g. the generation of an event to the user indicating a temporary out of service condition due to a hand-off occurrence).

The AH enables the triggering of these events by inserting armed Triggers 517 in correspondence of given Transitions 511.

With respect to the Adaptation Path expressed as a hierarchical FSM

FSM transitions are triggered only when the corresponding Monitored Parameters 510 vary outside the boundaries imposed by the QoS Contract 504 associated with the given QoS State 503 for more than a given amount of time (by defining a guard timer). This mechanism is proposed so as to avoid FSM flipping states rapidly due to rapid transitory fluctuation. The specification of said guard timer is conveyed within said Monitored Parameter 510.

As aforementioned, Transitions 511 involving Controllable States 508 trigger only control mechanisms, which however are not specified through this Data Model (it is up to the QoS Broker 106 to figure out the correct action to take). This means that these Transitions are associated with QoS changes which do not force the operative point (i.e. the set of values of all the parameters specified in the given QoS Contract Type 505) to move outside of the bounds set by the Negotiable States 509.

Differently from QDL [J. P. Loyall, et al., QoS Aspect Languages and their Runtime Integration, in Lecture Notes in Computer Science, Vol. 1511, Springer-Verlag], the specifications of the QoS Contract 504, States 503, Transitions 511, and the Actions 512 to be taken upon Transitions occurrence are de-coupled as indicated in FIG. 5. This introduces modularity and thus flexibility to the design: one can combine a given QoS Contract with different adaptation policies, and adaptation policies can be configured with different hierarchical FSMs. At the bottom of this hierarchical structure, named States and Transitions can be finally directly applied to individual Streams 502.

II.6.1 Negotiation of the Adaptation Path

So far only the negotiation of QoS Contracts 504 in specific QoS Contexts 501 and, eventually, of multimedia components (like e.g. codes) has been taken into account.

However, before ever going to that level of details, the various communicating peers using the mechanisms described in the previous paragraphs need to share a common knowledge of adaptation path, that is the structure of the hierarchical FSM must be agreed by all said communicating peers.

Also in this case negotiation schemes derived from those defined in [ITU-T Recommendation X.641 (12/97)|ISO/IEC 13236:1998, Information technology—Quality of Service: Framework] can be used, whereby however the negotiated entity is not a parameter or a contract, rather the adaptation policies themselves. This means that the peers need to negotiate the various QoS Contracts 504 describing degraded levels of QoS along with the rules describing when and how transitions among the various degraded levels should occur.

This form of negotiation therefore implies the aforementioned ones: by negotiating the hierarchical FSM one necessarily has to negotiate also the individual Negotiable States 509 only.

The negotiation process typically involves an initiator and one or multiple responders, and can be performed in one shot or on an iterative basis [ITU-T Recommendation X.641 (12/97)|ISO/IEC 13236:1998, Information technology—Quality of Service: Framework]. The initiator offers a bid to the responders, who examine it and return a counteroffer to the initiator. The latter collects the counteroffers and determines the one (if any) which satisfies the requirements of all the involved parties. Once such optimal counteroffer has been sorted out, the initiator sends it as a new bid to each responder. In an iterative scheme, the process could at this point restart, should one of the responder still do not accept the new bid. The iterative approach must however be constrained with an upper limit of iteration, and it is in any case quite complex and not efficient. Therefore this invention focuses only on the basic, non-iterative scheme.

The idea introduced in EP 00 111 191.3 basically consists in running a non iterative negotiation process at start-up time, i.e. when an initiator peer starts communicating with other peers (e.g. at session invitation time), with respect to adaptation paths. The initiator will propose a hierarchical FSM (i.e. a specific adaptation path), and each responder will validate the bid against its own adaptation policies, and respond accordingly with a counteroffer. This invention limits the scope of the counteroffers to the definition of a subset of the original bid (in order to limit the complexity level of the problem). This translates at responder level into:

a QoS Contract conformance verification [S. Frolund, J. Koistinen, QML: A Language for Quality of Service Specification, HP-Lab Technical Reports, HPL-98-10, 980210 (http://www.hpl.hp.com/techreports/98/HPL-98-10.html) applied to each QoS State 503 with respect to the QoS Contract Types 505 and QoS Contracts 504 applicable for the given responder, and a set of pruning operations applied onto the structure of the original hierarchical FSM proposed by the initiator.

One must note that whenever a new communicating peer joins a group of already communicating peers, the new peer act as initiator of a new negotiation process at Session Context level, following the same mechanisms described above. Furthermore, any ad hoc (i.e. not already taken into account in the negotiated adaptation path) creation, modification, or removal of QoS Contexts 501 and/or Streams 502 after that the negotiation process has been successfully completed, would trigger once again a new instance of the negotiation process.

Since the negotiation process is quite expensive (and exactly for this reason the idea proposed in EP 00 111 191.3 is to limit it only at start-up time), successive re-negotiation as described above can cause inefficiencies. To this extent one must however note that:

in a video-on-demand scenario, both parties simply agree a priori on a degradation path on a predetermined set of Streams 502, in order to cope with QoS changes. The variability of the aforementioned ad hoc changes therefore does not apply to this case.

the initiator can eventually already take into account events like the creation, modification, or removal of QoS Contexts 501 and/or Streams 502 in the adaptation path it bids.

after the initial negotiation, all peers can more quickly converge to negotiation agreements compared to the case of the initial negotiation, since the majority of them are using an already negotiated hierarchical FSM.

Finally, one must note that the user her/himself might deliberately cause a QoS change on an already running multimedia application, for example in order to increase or decrease the overall level of QoS, or some part of it only. This negotiation would reflect in a change in the QoS Contracts associated with the adaptation path, but could also reflect on the structure of adaptation path itself.

QoS Context 501 priority can be used for at any given time attributing more resources (and thus provide more QoS) to the highest priority streams bundled within the given QoS Context. Whereas the lower priority streams bundled to said QoS Contest will be consequently given fewer resources (and thus be rendered with lesser QoS).

Said QoS Context 501 priority shall be able to be reassigned at run time, so that the user can choose (e.g. by moving the mouse cursor from one video stream window to another) which stream at any given time shall be assigned the highest share of total booked QoS Context resources. Continuing the aforementioned example, the video stream window selected by the user by pointing the mouse cursor onto it, will render the video content at the highest level of QoS possible, to the detriment of the other streams rendered on the other windows.

III. API Description

This invention proposes the definition of an API compliant with the definition of Interface Type D, as described in EP 00 111 191.3.

The main goal of this API is to enforce the model described in §II., in such a way that the underlying middleware 103/105 is able to leverage existing or new multimedia frameworks. By using COTS multimedia frameworks, the middleware can thus autonomously assemble and manage chains of multimedia components according to the QoS specifications and the measured levels of monitored QoS parameters.

The API shall therefore be based on an object model that reflects the aforementioned logical model. The following pseudo-code (written in Java-style), shows how an implementation of said API can look like, with respect to the creation, management, and disposal of communications links among QoS-aware peer applications.

To this extent two reference scenarios are taken into account: Interactive Service Scenario and Information-Retrieval Service Scenario. The former describes typical cases of multiparty communication like a videoconference. The latter focuses instead on cases of web-based audio/video streaming like video on demand.

III.1 Interactive Service Scenario

The following pseudo-code snippet gives the idea of how an initiator can set up a videoconference with a set of parties. For the sake of simplicity, Layers 303 and Controllable States 508 are not addressed in this example.

In order to more clearly describe this example, the following pseudo-code snippet introduces a possible implementation of the Transaction 511 concept:

```
abstract public class Transition {
  private Hashtable monitors = new Hashtable( );
  private Hashtable actions = new Hashtable( );
  private QoSContractType contract;
  public Transition (QoSContractType contract) {
    this.contract = contract;
  }
  public void addMonitor(String name, Object monitorRef)
    monitors.put(name, monitorRef);
  }
  public boolean removeMonitor(String name, Object monitorRef)
    return (monitors.remove(name, monitorRef) != null);
  }
  public Object getMonitor(String name, Object monitorRef)
    return monitors.get(name, monitorRef);
  }
  public void addAction(String name, Object monitorRef)
    actions.put(name, monitorRef);
  }
  public boolean removeAction(String name, Object monitorRef)
    return (actions.remove(name, monitorRef) != null);
  }
  public Object getAction(String name, Object monitorRef)
    return actions.get(name, monitorRef);
  }
  abstract public boolean evaluate( );
} /* End of Transition */
abstract class MonitoredParameter {
  private Object mon;
  abstract public Object getValue( );
} /* End of MonitoredParameter */
```

The users through a proper GUI (or the developer programmatically), shall first of all identify themselves with the system. This allows to either retrieve or create/customize a user general service profile, specifying e.g. privileges, general preferences, quotas, etc. along with adaptation policies (e.g. how to react to a case when the user exceeds her/his quota). This information is modeled as a User Context 202.

```
class MyQoSForUserContractType extends QoSContractType {
  public String privileges;
  public int quota;
} /* End of MyQoSForUserContractType */
MyQoSForUserContractType userContract1 =
  new MyQoSForUserContractType(privilege, quota);
MyQoSForUserContractType userContract2 =
  new MyQoSForUserContractType(less_privilege, less_quota);
class NormToLowTransition extends Transition {
  private int down_hysteresis_threshold;
  public NormToLowTransition(MyQoSForUserContractType contract,
                              int down_hysteresis_threshold)
  {
    super(contract);
    this.down_hysteresis_threshold = 1 - down_hysteresis_threshold;
  }
  public boolean evaluate ( ) {
    MonitoredParameter mon;
    return ((mon = (monitors.get("quota") != null)) &&
      (mon.getValue( ).intValue() <=
      (contract.quota * down_hysteresis_threshold)));
  }
} /* End of NormToLowTransition */
``` create transition NORMAL to LOW with 30% hysteresis threshold. The concept of hysteresis and the specification of monitors is totally application-specific

```
NormToLowTransition normToLow =
                new NormToLowTransition (userContract1, 0.3);
normToLow.addMonitor("quota", quota_monitor_ref);
``` build outermost FSM, with respect to the user: user1. For the sake of simplicity, only one transition is shown

```
UserContext user1 = ApplicationHandler.createUser(userName);
user1.addState(NORMAL, userContract1);
user1.addState(DEGRADED, userContract2);
user1.addTransition(NORMAL, DEGRADED, normToLow);
// Set initial state
user1.setDefState(NORMAL);
```

Creates FSM associated with the Application Context 203

```
class MyQoSForApplicationContractType extends
QoSContractType {
  public String privileges;
  public int sched_frequency;
} /* End of MyQoSForApplicationContractType */
MyQoSForApplicationContractType applContract1 =
  new MyQoSForApplicationContractType (privilege, freq);
MyQoSForApplicationContractType applContract2 =
  new MyQoSForApplicationContractType (more privilege,
more_freq);
class MedToMaxApplTransition extends Transition {
  private int up_hysteresis_threshold;
  public MedToMaxApplTransition(MyQoSForUserContractType
contract,
                    int up_hysteresis_threshold) {
    super(contract);
    this.up_hysteresis_threshold = 1 +
up_hysteresis_threshold;
  }
  public boolean evaluate ( ) {
    MonitoredParameter mon;
    return ((mon = (monitors.get("freq") != null)) &&
        (mon.getValue() >= (contract.sched_frequency *
                    up_hysteresis_threshold)));
  }
} /* End of MedToMaxApplTransition */
``` create transition MEDIUM to MAXIMUM with 25% hysteresis threshold

```
MedToMaxApplTransition medToMaxApplTr =
           new
MedToMaxApplTransition(applContract1, 0.25);
medToMaxApplTr.addMonitor("freq", frequency_monitor_ref);
``` build inner FSM, with respect to the user: user1 and application: application1. For the sake of simplicity, only one transition is shown

```
ApplicationContext application1 =
  ApplicationHandler.createApplication(applicationName);
application1.addState(MEDIUM, applContract1);
application1.addState(MAXIMUM, applContract2);
application1.addTransition(MEDIUM, MAXIMUM, medToMaxApplTr);
// Set initial state
application1.setDefState(MEDIUM);
// Nest this FSM into the outer
ApplicationHandler.nest(user1.getState(NORMAL),
                application1.getState(MEDIUM));
ApplicationHandler.nest(user1.getState(NORMAL),
                application1.getState(MAXIMUM));
```

Creates FSM associated with the Session Context 204

```
class MyQoSForSessionContractType extends QoSContractType {
  public String privileges;
  public int total_bandwidth;
} /* End of MyQoSForSessionContractType */
MyQoSForSessionContractType sessContract1 =
  new MyQoSForSessionContractType (privilege, bandwidth);
MyQoSForSessionContractType sessContract2 =
  new MyQoSForSessionContractType (more_privilege, more_
bandwidth);
class MedToMaxSessTransition extends Transition {
  private int up_hysteresis_threshold;
```

-continued

```
public MedToMaxSessTransition(MyQoSForSessionContractType
contract,
                    int up_hysteresis_threshold) {
    this.up_hysteresis_threshold = 1 +
up_hysteresis_threshold;
  }
  public boolean evaluate ( ) {
    MonitoredParameter mon;
    return ((mon = (monitors.get("total_BW") != null)) &&
        (mon.getValue().intvalue() >=
        (contract.total_bandwidth *
up_hysteresis_threshold)));
  }
} /* End of MedToMaxSessTransition */
``` create transition MEDIUM to MAXIMUM with 25% hysteresis threshold

```
MedToMaxSessTransition medToMaxSessTr =
           new
MedToMaxSessTransition(sessContract1, 0.25);
medToMaxSessTr.addMonitor("total_BW", total_BW_monitor_ref);
``` build inner FSM, with respect to the user: user1 and application: application1 and session: session1. For the sake of simplicity, only one transition is shown

```
SessionContext session1 =
      ApplicationHandler.createSession(priority);
session1.addState(MEDIUM, sessContract1);
session1.addState(MAXIMUM, sessContract2);
session1.addTransition(MEDIUM, MAXIMUM, medToMaxSessTr);
// Set initial state
session1.setDefState(MEDIUM);
// Nest this FSM into the outer
ApplicationHandler.nest(application1.getState(MAXIMUM),
        session1.getState(MEDIUM));
ApplicationHandler.nest(application1.getState(MAXIMUM),
        session1.getState(MAXIMUM));
```

Creates a Per Session Role 309 Association 301 within the Session Context 204 session1. The Association 301 identifies the peer: this means that an association should always be created to identify the peer of any given stream. Eventually, an association can be created for just one stream.

```
Association association1 =
  ApplicationHandler.createAssociation(calledPartyName,
  associationPriority);
  PerSessionRole role = new PerSessionRole(session1);
  association1.setRole(role);
  session1.addAssociation(association1);
```

Create a Stream 502: to this extent one has first to specify the transport address of the destination endpoint, the type of stream (audio, video, control, data) and the type of endpoint the initiator peer is acting as for such stream (stream source or stream sink). The stream must then be bound to the remote endpoint by specifying the association

```
            Stream stream1 =
                ApplicationHandler.createStream(calledParty
                Address,
                        streamType,
                endPointType);
            association1.addStream(stream1);
```

Create FSM associated with a Stream 502 by specifying an adaptation path for the Stream itself.

```
class MyQoSForStreamContractType extends QoSContractType {
    public int frame_rate;
    public int image_quality;
}/*End of MyQoSForStreamContractType */
MyQoSForStreamContractType streamContract1 =
    new MyQoSForStreamContractType (fRate, imageQuality);
MyQoSForStreamContractType streamContract2 =
    new MyQoSForStreamContractType (higher_FRate,
more_ImageQuality);
class MedToMaxStreamTrans extends Transition {
    private int up_hysteresis_threshold;
    public MedToMaxStreamTrans(MyQoSForSessionContractType
contract,
            int up_hysteresis_threshold) {
        this.up_hysteresis_threshold = 1 +
up_hysteresis_threshold;
    }
    public boolean evaluate ( ) {
    MonitoredParameter mon;
    return (
        ((mon = (monitors.get("frame_rate") != null)) &&
            (mon.getValue( ).intValue( ) >=
                (contract. frame_rate *
up_hysteresis_threshold)))
        &&
            ((mon = (monitors.get("image_quality") !=
null)) &&
                (mon.getValue( ).intValue( ) >=
                        contract.image_quality))
        );
    }
} /* End of MedToMaxStreamTrans */
``` create transition MEDIUM to MAXIMUM with 15% hysteresis threshold

```
            MedToMaxStreamTrans medToMaxStrTr =
                new MedToMaxStreamTrans(streamContract1,
            0.15);
            medToMaxStrTr.addMonitor("frame_rate",
            frame_rate_monitor_ref);
            medToMaxStrTr.addMonitor("image_quality",
            image_quality_monitor_ref);
``` create adaptation path for the stream: stream1, that is build inner FSM, with respect to the user: user1 and application: application1 and session: session1 and stream: stream1. For the sake of simplicity, only one transition is shown. This is the innermost FSM of the overall hierarchical FSM.

```
        stream1.addState(MEDIUM, sessContract1);
        stream1.addState(MAXIMUM, sessContract2);
        stream1.addTransition(MEDIUM, MAXIMUM, medToMaxStrTr);
        // Set initial state
        stream1.setDefState(MEDIUM);
```

```
        // Nest this FSM into the outer
        ApplicationHandler.nest(session1.getState(MEDIUM),
            stream1.getState(MEDIUM));
        ApplicationHandler.nest(session1.getState(MEDIUM),
            stream1.getState(MAXIMUM));
```

Specify a Drop 514 action at session level for the transition medToMaxSessTr, with respect to stream: stream1

```
        medToMaxSessTr.addAction("drop_stream", stream1);
```

Specify a Create 513 action at session level for the transition maxToMedSessTr (not shown above), with respect to association: association1

```
        medToMaxSessTr.addAction("create_association",
            association1);
```

Finally, activate the overall FSM. Additional QoS Contexts, Associations, and Streams can be later specified and activated. This however would imply a re-negotiation process.

```
        ApplicationHandler.activate(user1);
```

At this point the middleware has collected the information necessary to 1. selects the QoS Broker plug-ins required to process the semantic of the given QoS Contract Type
2. negotiate a Adaptation Path with the local resource controllers, with all the involved parties, and with the network telecommunication systems
3. create the ChCs as required
4. retrieve and chain multimedia components as required to achieve the given goals
5. activate monitors
6. evaluate QoS changes events and react accordingly Synchronization issues: assumed that another Stream 502 stream2 has been defined similarly to stream1, the following code snippet shows how the two streams can be synchronized within the context of the Association association1

```
        SynchronizationInformation syncInfo1 = new
            SynchronizationInformation(aLag,
            aJitter);
        association1.setSyncReference(stream1);
        association1.synchronize(stream2, syncInfo1);
```

Ad hoc disposal of any QoS Context, Association, or Stream, i.e. any not a priori known decision of any of the involved parties, will be translate in instructions used for pruning the original hierarchical FSM. This operation, will trigger re-negotiations as necessary. Example:

```
association1.dispose(stream2);
```

Annunciation of any incoming request from a remote peer to establish communications will typically involve application-level actions or even user interactions (e.g. to specify whether to accept or not such request). This process is part of the negotiation process. To this extent, the Application 101 shall be able to catch any of such events generated by the middleware 103/105 through the API 102. Example:

```
ApplicationHandler.registerForAnnunciation(listener_ref);
```

To this extent, the Application 101 shall therefore be able to intercept annunciation events (inluding those indicating the request of disposal of given Streams) by implementing a specific event listener interface like:

```
public interface Annunciation {
    public void newStream(NewStreamEvent);
    public void disposeStream(DisposeStreamEvent);
}
```

III.2 Information-Retrieval Service Scenario

Substantially this scenario differs from the one described in the previous paragraph, insofar as in this case one of the peers will prepare a data model where all the possible details are already taken into account. This means that the adaptation path is static after the negotiation process is over. No new QoS Contexts, Associations, or Streams are created after start-up, unless described in the negotiated adaptation path (i.e. in the hierarchical FSM).

IV. The Main Advantageous Differences Between the Invention and State of the Art are the Following:

V. EXAMPLE

As indicated in FIG. 1, not only Applications Type D as defined in EP 00 111 191.3 can effectively and efficiently use this invention, but also enhanced web-browsers can benefit from this API. In fact, web-browser programs designed so as to use said API (either natively or through the use of a proper plug-in), can interpret XML documents describing the data model presented in §II.

In this way, application design is even more simplified to a simple document preparation, that is a fully declarative programming language.

Furthermore, Applications Type D can be even totally unaware of the Interface Type D, but still be QoS-aware (in the sense that these specific applications can still allow the use QoS-enabled communication links). This can be achieved by using an external QoS Broker GUI, a program that can be used to interactively establish and change QoS for registered applications. For more detail, please refer to EP 00 111 191.3, hereby incorporated by reference.

A statechart representing an example of instantiation of the hierarchical FSM is presented in FIG. 6, where QoS Contexts 601, 603, 605 are put in evidence with respect to the States 602, 604, 606. For the sake of simplicity, each QoS Context is shown as associated with a unique instance of a FSM (e.g. the given User Context 601 is associated with only one hierarchical FSM, each state of which contains only one nested FSM). By using the concurrency concept of statecharts [G. Booch, J. Rumbaugh, I. Jacobson, The Unified Modeling Language User Guide, Addison Wesley Longman, 1999, ISBN 0-201-5718-4] one can easily model more complicated scenarios where, e.g. a user may have two applications running (for instance a videoconference one and a video-on-demand one) and each featuring its own hierarchical FSM.

At the lowest level of the hierarchical FSM are inner FSM features composed of only Controllable State 609, one within each QoS State associated with a given Stream.

Such FSM composed of only Controllable State can be either specified ad-hoc through the API 102 or can simply be general purpose ones used across the hierarchical FSM.

The invention claimed is:

1. A computer readable tangible non-transitory storage medium having a computer program stored thereon for man-

| ID | Subject | Description |
|---|---|---|
| 1 | Declarative Interface | Since this invention moves QoS adaptation issues to the middleware, applications get thin and simple.<br>The middleware can eventually be split between thin mobile client middleware and proxy solutions.<br>This invention allows the transparent use of various multimedia frameworks |
| 2 | Data Model | This data model can be used to implement document-based applications<br>Addresses QoS adaptability combined with synchronization of streams originated by different sources. |
| 3 | QoS-steered extensible architecture | Allows retrieval of QoS Broker plug-ins and multimedia components at run-time, in an open manner, based on QoS constraints. |
| 4 | QoS Contract Sub-typing | QoS Contract Types can be derived from pre-existing ones in a hierarchical scheme, so that the middleware offering the hereby-described API can automatically grab components and plug-ins, based on the given QoS Contract Types or on any of the super-types of the latter. |
| 5 | Modular architecture | Full code reuse, and delegation: scalable solution. | aging quality of service, the program representing middleware and comprising executable instructions that cause a computer to:

configure an application programming interface as a data model describing quality-of-service adaptation paths as specified by quality-of-service aware mobile multimedia applications using said application programming interface, in order to manage quality-of-service and mobility-aware network connections with other applications, a quality-of-service adaptation path defining an adaptation policy in terms of alternative quality-of-service contracts identifying alternative quality-of-service specifications and rules for switching between the alternative quality-of-service contracts based on a comparison of the contracted QoS specification with the actual quality-of-service, and wherein said middleware is adapted to repeatedly measure the actual quality-of service and to repeatedly select one of the alternative quality-of-service contracts according to the rules for switching between the alternative quality-of-service contracts based on a comparison of the contracted quality-of-service specifications with the actual quality-of-service, the quality-of-service specifications of the selected quality-of-service contract describing a currently to be achieved quality-of-service for one or more network connections, and wherein the adaptation paths are modeled as hierarchical finite state machines, each quality-of-service contract of an adaptation path corresponding to a different state of a hierarchical finite state machine, said rules for switching between the alternative quality-of-service contracts corresponding to transitions between the states of a hierarchical finite state machine and each hierarchical finite state machine comprising:

a finite state machine associated with a User Context, a finite state machine associated with an Application Context nested in said finite state machine associated with said User Context and a finite state machine associated with a Session Context nested in said finite state machine associated with said Application Context, wherein said User Context, said Application Context and said Session Context each identify an arrangement of quality-of-service specifications enforceable through a set of streams belonging to a given user, multimedia application and telecommunication session, respectively, the given user partaking in the given telecommunication session by means of executing the given multimedia application, wherein said middleware derives quality-of-service specifications of an Application Context from the quality-of-service specifications of the nesting User Context and quality-of-service specifications of a Session Context from the quality-of-service specifications of the nesting Application and User Contexts, and wherein said arrangements of quality-of-service specifications identified in said User Context, said Application Context and said Session Context are specified by said multimedia applications using said application programming interface.

2. The computer readable tangible storage medium according to claim 1, wherein the hierarchical finite state machines comprise controllable states in the context of streams at the lowermost level.

3. The computer readable tangible storage medium according to claim 1, wherein quality-of-service synchronization is provided so as to ensure that some user's given constraints on quality-of-service are globally enforced throughout a given set of streams by applying a defined set of quality-of-service constraints to each stream of a set of streams.

4. The computer readable tangible storage medium according to claim 1, wherein the specification of the quality-of-service contracts comprises hysteresis parameters for the transition between quality-of-service states time synchronization is provided for a multiplicity of related streams by a definition of time-synchronization constraints for related streams having the same destination.

5. The computer readable tangible storage medium according to claim 1, wherein the specification of the quality-of-service contracts comprises utility parameters defining user's perceived utility factors associated with the respective quality-of-service contract.

6. The computer readable tangible storage medium according to claim 1, further comprising executable instructions that cause a computer to provide an application handler unit to offer said application programming interface for providing quality-of-service aware mobile multimedia applications with the possibility of managing network connections with other applications.

7. The computer readable tangible storage medium according to claim 6, wherein the application handler unit registers requests for notification events from applications and generates such events whenever the corresponding triggering conditions occur.

8. The computer readable tangible storage medium according to claim 6, wherein the application handler unit operates on the basis of a data model comprising streams, quality-of-service context, quality-of-service associations and adaptation paths modeled as hierarchical finite state machines.

9. The computer readable tangible storage medium according to claim 8, wherein the application handler unit creates for each unidirectional stream an instance of a chain controller for handling data plane and quality-of-service control plane related issues.

10. The computer readable tangible storage medium according to claim 9, wherein the chain controller compares the quality-of-service requirements of a user with actual values of monitored parameters and configures a chain of multimedia components accordingly.

11. The computer readable tangible storage medium according to claim 10, wherein the chain controller creates and manages a transport service interface socket, whereby said multimedia components directly exchange data through said transport service interface socket.

12. The computer readable tangible storage medium according to claim 9, wherein the chain controller monitors and controls the local resources required to process the given stream by using resource managers.

13. The computer readable tangible storage medium according to claim 9, further comprising executable instructions that cause a computer to configure a quality-of-service broker for managing overall local resources by managing the whole set of streams via the chain controllers.

14. The computer readable tangible storage medium according to claim 13,
wherein the quality-of-service broker manages system-wide resources via resource controllers.

15. The computer readable tangible storage medium according to claim 13,
wherein the quality-of-service broker controls end-to-end quality-of-service negotiation by using a session manager.

16. The computer readable tangible storage medium according to claim 13,
wherein the quality-of-service broker includes further functionality for downloading plug-ins corresponding to a given version of a data model which can not be handled by the application handler unit.

17. The computer readable tangible storage medium according to claim 16,
wherein the quality-of-service broker and the plug-ins are forming a quality-of-service broker cluster.

18. The computer readable tangible storage medium according to claim 17,
wherein the application handler unit and the various instances of the chain controller are forming an application handler cluster.

19. The computer readable tangible storage medium according to claim 18,
wherein the application handler cluster and the quality-of-service broker cluster are included in one open distributed processing capsule.

20. The computer readable tangible storage medium according to claim 18,
wherein the application handler cluster and the quality-of-service broker cluster are included in separate open distributed processing capsules.

21. The computer readable tangible storage medium according to claim 20,
wherein the application handler cluster being included in one open distributed processing capsule is installed on a given local node and the quality-of-service broker cluster being included in separate open distributed processing capsule is installed on a separate open distributed processing node, whereby a proxy quality-of-service broker is installed on the given local node.

* * * * *

UNITED STATES PATENT AND TRADEMARK OFFICE
CERTIFICATE OF CORRECTION

| | | |
|---|---|---|
| PATENT NO. | : 7,814,184 B2 | Page 1 of 1 |
| APPLICATION NO. | : 10/006067 | |
| DATED | : October 12, 2010 | |
| INVENTOR(S) | : Davide Mandato et al. | |

It is certified that error appears in the above-identified patent and that said Letters Patent is hereby corrected as shown below:

On the title page, Item (30), the Foreign Application Priority Data is incorrect. Item (30) should read:

-- (30)     Foreign Application Priority Data

Dec. 8, 2000   (EP)     ........................................ 00126975 --

Signed and Sealed this
Ninth Day of August, 2011

David J. Kappos
*Director of the United States Patent and Trademark Office*